(12) United States Patent
Pastoor et al.

(10) Patent No.: US 9,421,879 B2
(45) Date of Patent: Aug. 23, 2016

(54) VEHICLE SYSTEM

(71) Applicant: LELY PATENT N.V., Maassluis (NL)

(72) Inventors: Jan Lambertus Pastoor, Rijswijk (NL);
Howard Sie, Rotterdam (NL); Karel Van Den Berg, Bleskensgraaf (NL)

(73) Assignee: LELY PATENT N.V., Maassluis (NL)

( * ) Notice: Subject to any disclaimer, the term of this patent is extended or adjusted under 35 U.S.C. 154(b) by 119 days.

(21) Appl. No.: 14/250,397

(22) Filed: Apr. 11, 2014

(65) Prior Publication Data

US 2014/0217977 A1 Aug. 7, 2014

Related U.S. Application Data

(63) Continuation of application No. PCT/NL2012/050642, filed on Sep. 13, 2012.

(30) Foreign Application Priority Data

Oct. 11, 2011 (NL) ..................................... 2007566

(51) Int. Cl.
*H02J 7/00* (2006.01)
*B60L 11/18* (2006.01)

(52) U.S. Cl.
CPC ......... *B60L 11/1833* (2013.01); *B60L 11/1818* (2013.01); *B60L 11/1827* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
CPC ...................................... Y02T 90/14

USPC .......................................................... 320/109
See application file for complete search history.

(56) References Cited

U.S. PATENT DOCUMENTS 3,986,095 A 10/1976 Nakai et al.
4,777,416 A 10/1988 George, II et al.
(Continued)

FOREIGN PATENT DOCUMENTS

EP 0468960 A1 2/1992
EP 2393165 A1 12/2011
(Continued)

OTHER PUBLICATIONS

Earlier Search Report for NL2007566 issued on Jul. 5, 2012.
(Continued)

*Primary Examiner* — Edward Tso
*Assistant Examiner* — Ahmed Omar
(74) *Attorney, Agent, or Firm* — Hoying Rokh Monegier LLP; Ramin Amirsehhi; David P. Owen

(57) ABSTRACT

A vehicle system with a charging station and an autonomously movable, electrically powered vehicle dockable therewith, the vehicle system being mutually engageable at an inlet-side on the vehicle and an outlet-side on the charging station arranged to transport energy between the charging station and vehicle when engaged and further being provided with an inlet-side guiding member, an outlet-side guiding member, respectively, arranged to guide the inlet-side and outlet-side engagements from a non-charging position into a charging position upon engaging of the inlet- and outlet-sides when docking the vehicle to the charging station.

17 Claims, 2 Drawing Sheets

(56) References Cited

U.S. PATENT DOCUMENTS

| | | | |
|---|---|---|---|
| 5,272,431 A | 12/1993 | Nee | |
| 5,462,439 A * | 10/1995 | Keith | B60L 1/08 180/279 |
| 7,999,506 B1 * | 8/2011 | Hollar | B60L 11/1818 320/104 |
| 2009/0189564 A1 * | 7/2009 | Vasilantone | B60L 8/003 320/108 |
| 2011/0300738 A1 | 12/2011 | Hengel et al. | |

FOREIGN PATENT DOCUMENTS

| | | |
|---|---|---|
| JP | 9-102429 A | 4/1997 |
| JP | 2003-118671 A | 4/2003 |

OTHER PUBLICATIONS

International Search Report for PCT/NL2012/050642 issued on Dec. 6, 2012.
International Preliminary Report on Patentability for PCT/NL2012/050642 dated Apr. 15, 2014.

* cited by examiner

VEHICLE SYSTEM

CROSS REFERENCE TO RELATED APPLICATIONS

This application is a continuation of PCT application number PCT/NL2012/050642 filed on 13 Sep. 2012, which claims priority from NL application number 2007566 filed on 11 Oct. 2011. Both applications are hereby incorporated by reference in their entireties.

BACKGROUND OF THE INVENTION

1. Field of the Invention

The invention relates to a vehicle system comprising at least one charging station and at least one autonomously movable, electrically powered vehicle dockable therewith, the vehicle including an inlet-side coupling device and the charging station including an outlet-side coupling device, said inlet-side coupling device and said outlet-side coupling device being mutually engageable and arranged to transport energy between the charging station and vehicle when engaged, said inlet-side coupling device and said outlet-side coupling device further being provided with an inlet-side guiding member, an outlet-side guiding member, respectively, arranged to guide the inlet-side and outlet-side coupling device from a non-charging position into a charging position upon engaging of said inlet-side and outlet-side coupling device when docking the vehicle to the charging station.

2. Description of the Related Art

Such vehicle systems are known in the art. The vehicles generally include electrical motors to drive e.g. wheels, as well as working means for executing certain tasks. The power for the electrical motor(s) is generally provided by on-board batteries. These batteries of course need to be recharged at regular intervals to allow the vehicle to function.

Thus known systems also provide for a charging station for supplying power to the onboard batteries. In order for the batteries to be charged, power needs to be transferred from the charging station to the vehicle and the vehicle and the charging station need to be into contact with each other for conductive charging with electrical contacts. To provide for more reliable coupling, guiding members may be provided, to steer the electrical contacts to one another when engaging.

Examples of such vehicle systems include e.g. robotic vacuum cleaners, lawn mowers and automatically guided vehicles (AGV's). Robotic lawn mowers and vacuum cleaners are relatively small and light systems. The charging stations of these known systems include a base or other structure that encompasses or accommodates the vacuum cleaner or lawn mower itself for a substantial part, thus guiding the contacts of the power inlet and power supply into a charging position, i.e. into contact one with the other. In EP3236279 the robot mower drives up a ramp until the front wheel is lifted clear from the ground, at which point a front electrical conducting contact is put into contact with a charging contact and a charging position is obtained.

Other systems show a charging or docking station having actively movable arms arranged to be moved towards and into contact with the vehicle in order to realize the charging position between the power inlet and outlet sub-structures. U.S. Pat. No. 4,777,416 shows an autonomous movable robot having a conductor band as an input coupling means for electricity and a docking station in the form of a housing. Inside the housing is an opening, and a drivable arm is provided as a power outlet coupling means carrying a pair of contacts, the arm being projectable through the opening. Similarly U.S. Pat. No. 5,272,431 and EP0468960 show drivable arms as power inlet-coupling means carried inside electric vehicles, the arms are to be deployed and directed towards a power outlet sub-structure of the charging station when the vehicle is positioned near the station to realize the charging position.

All these systems require maneuvering the vehicle in a charging position relative to the charging station. Some of these systems require additional maneuvering of one of the coupling means relative to the vehicle or the station. Even with sophisticated guiding systems it remains a challenge to provide a system that allows for easy, efficient and particularly reliable positioning of the power inlet sub-structure relative to the power outlet sub-structure into the charging position.

BRIEF SUMMARY OF THE INVENTION

It is an object of the invention to provide a vehicle system wherein the respective power inlet and outlet coupling means for the vehicle and the charging station can be brought into the charging position easily and reliably.

This object is achieved by a vehicle system comprising at least one charging station and at least one autonomously movable, electrically powered vehicle dockable therewith, the vehicle including an inlet-side coupling device and the charging station including an outlet-side coupling device, said inlet-side coupling device and said outlet-side coupling device being mutually engageable and arranged to transport energy between the charging station and vehicle when engaged, said inlet-side coupling device and said outlet-side coupling device further being provided with an inlet-side guiding member, an outlet-side guiding member, respectively, arranged to guide the inlet-side and outlet-side coupling device from a non-charging position into a charging position upon engaging of said inlet-side and outlet-side coupling device when docking the vehicle to the charging station, wherein said inlet-side coupling device is arranged to be deflectingly movable relative to the vehicle in a first plane, and said outlet-side coupling device is arranged to be deflectingly movable relative to the charging station in a second plane, wherein said first plane and said second plane are arranged substantially horizontally, to enable alignment of the inlet-side and outlet-side coupling device upon their engaging.

In an embodiment, said inlet-side coupling device comprises one of an electric socket or a complementary plug, and said outlet-side coupling device comprises an other of said electric socket and said complementary plug.

In an embodiment, said inlet-side coupling device and said outlet-side coupling device are arranged to be deflectingly movable in a third plane relative to the vehicle, and a fourth plane relative to the charging station, respectively, wherein said third plane and said fourth plane are arranged substantially parallel, to enable alignment of the inlet-side and outlet-side coupling device upon their engaging, and wherein the third plane makes a non-zero angle with the first plane.

In a further embodiment, at least one of the coupling device or guiding members is arranged to be linearly telescopically movable in a direction within the first plane and relative to one of the vehicle and the charging station, to which it is provided.

In another embodiment, both the coupling device and the guiding members are arranged to be linearly telescopically movable in a direction within the first plane and relative to one of the vehicle and the charging station, to which it is provided.

In another embodiment, the direction of linear telescopic movement substantially coincides with the direction of travel of the vehicle when docking to the charging station.

In an embodiment, a deflecting member is provided between said vehicle and said inlet-side coupling device, and between said charging station and said outlet-side coupling device.

In another embodiment, the deflecting member comprises a hinge with at least a first hinge axis perpendicular to the first plane.

In an embodiment, the deflecting member further comprises a second hinge with a second axis perpendicular to the second plane.

In a further embodiment, the deflecting member comprises a ball joint.

In an embodiment, the deflecting member comprises at least one resilient member.

In an embodiment, the deflecting member comprises at least two resilient members positioned one behind the other in a plane perpendicular to the first plane.

In a further embodiment, the linearly movable guiding member is advantageously provided with a biasing device between the guiding member and the vehicle or charging station to which it is provided, the biasing device being arranged to force the guiding member or arm into a first, extended position via a biasing force, and in which first position the guiding member is at a maximum distance from the vehicle or charging station on which it is provided.

In another embodiment, the biasing device comprises a biasing force reduction device arranged to exert a smaller biasing force when the guiding member is in the second position than when in the first position.

In an embodiment, the biasing force reduction device comprises a non-linear force spring.

In another embodiment, the biasing force reduction device comprise a linkage system with a tension spring having a force moment arm and arranged to shorten the force moment arm as the guiding member moves from the first to the second position.

In a further embodiment of the invention, a vehicle system is provided, having inlet-side coupling means arranged to be deflectingly movable relative to the vehicle in a first plane, and outlet-side coupling means is arranged to be deflectingly movable relative to a charging station in a second plane, wherein said first plane and said second plane are arranged substantially horizontally, to enable alignment of the inlet-side and outlet-side coupling means upon their engaging. Herein, "substantially horizontally" means that when both the vehicle and the station are positioned on a horizontal plane, the two planes of movability are also substantially horizontal. Of course, if the vehicle or station are on a slope, the planes of movability will change correspondingly. Furthermore, since the vehicle can move independently from the station, the first and second plane are in no way coupled before the vehicle and the station are. What actually matters is the first plane and the second plane can be brought into overlap upon engaging of the inlet-side and outlet-side coupling means. This can be done if the first and second plane are substantially parallel upon said engaging.

By providing deflectingly movable coupling means, a misalignment of the vehicle relative to the charging station can be corrected, because, whatever the offset between the coupling means, since both coupling means are deflectingly movable, both can be guided to deflect in the required direction by the, co-operating, guiding members, and the vehicle need not correct its course. Herein, the required direction is a line connecting the physical or virtual base of the inlet-side coupling means, where said means deflects, and the physical or virtual base of the outlet-side coupling means, where said means deflects. By having both coupling means deflect, they are able to both deflect to become aligned with said line, and thus into perfect alignment. Also by providing deflectingly movable coupling means there is no need to provide complicated driven systems, thus making the system simpler and more economical to build. Note that a single guiding member with deflecting coupling means on either vehicle or charging station cannot provide this alignment. In fact, the deflecting movement would only aggravate alignment problems.

In embodiments, said inlet-side coupling means comprise one of an electric socket or a complementary plug, and said outlet-side coupling means comprise another of said electric socket and said complementary plug. It is in particular with respect to such electrical socket-plug connections that the present invention offers its advantages. Such connections need good alignment to work properly and without lots of wear, and such alignment is provided with the deflectingly movable coupling means. The guiding members, which are of course rigidly connected to their respective coupling member, ensure by mutually co-operating that those coupling means, here the socket and plug, are aligned for reliable connection.

It is noted that the system described above functions well if the coupling means are arranged to deflect in one plane, such that an offset can be present in one direction. Arranging in one plane may suffice in many cases, for example when the height of the vehicle, and of course of the charging station's contacts, is always the same. This plane is preferably a horizontal plane. However, in practice it may occur that, due to soiling of the floor near the charging station, dirt on the wheels, et cetera, of the vehicle, changing tire pressure or load on the vehicle and so on, the coupling means are not always in one plane. In order to conquer this problem, the invention provides embodiments wherein said inlet-side coupling means and said outlet-side coupling means are arranged to be deflectingly movable in a third plane relative to the vehicle, a fourth plane relative to the station, respectively, wherein said third plane and said fourth plane are arranged substantially parallel, to enable alignment of the inlet-side and outlet-side coupling means upon their engaging, and wherein the third plane makes a non-zero angle with the first plane, and preferably is substantially perpendicular to the first plane. These embodiments ensure that any misalignment in more than one direction can be corrected, by having the guiding members cause the coupling means to deflect in the required direction for alignment.

Advantageously, at least one of the coupling means and/or guiding members is arranged to be linearly telescopically movable in a direction within the first plane and relative to one of the vehicle and the station, to which it is provided. This allows for a longer alignment path, thus making alignment and connection even more gentle. Furthermore, the telescopic movement could also be used to actually plug a plug or the like into the socket or the like. The linear telescopic movement is between a first, extended position wherein (e.g.) the guiding member is projected at a maximum distance from the vehicle or station on which it is provided, and a second, retracted position wherein the guiding member is at a minimum distance from the vehicle or the station respectively. Note that the rigid connection between guiding member and its respective coupling means is but for this telescopic moveability.

In particular, the direction of linear telescopic movement substantially coincides with the direction of travel of the vehicle when docking to the charging station. Here, "substantially" means that the directions are the same except for the misalignment. In other words, when the course of the vehicle is such that the coupling means are already in perfect alignment without deflecting, the direction of the telescopic movement and the traveling direction will coincide perfectly.

In embodiments, a deflecting member is provided between said vehicle and said inlet-side coupling means, and between said charging station and said outlet-side coupling means. This is a simple and elegant way of providing for the deflecting movability.

For example, the deflecting member comprises a hinge with at least a first hinge axis perpendicular to the first plane. This allows the hinge to hinge in the desired direction, preferably a horizontal direction, in order to compensate horizontal offsets. Of course, other directions are also possible. In addition, the deflecting member could further comprise a second hinge with a second axis perpendicular to the second plane, allowing for offset correction in more directions.

Alternatively, the deflecting member comprises a ball joint. This allows offset correction in multiple directions with a single hinge. Of course, well-known alternatives of a ball-joint are deemed to fall within the scope of the concept "ball joint".

In advantageous embodiments, the deflecting member comprises at least one resilient member. This allows the coupling means to return to a neutral, mostly central position after disengaging. Although this is not necessary, it offers the advantage that the guiding members, in that central position, will have the highest likelihood of being within range of their counterpart, to enable correct engaging and aligning.

In embodiments, the deflecting member comprises at least two resilient members positioned one behind the other in a plane perpendicular to the first plane. In between could be e.g. an arm, such that the whole of the resilient members and the arm work to guide the coupling means in a certain direction, without the resilient members themselves having to be made very elaborate.

In embodiments of the system with a linearly telescopically movable guiding member, the linearly movable guiding member is advantageously provided with a biasing means between the guiding member and the vehicle or station to which it is provided, biasing means being arranged to force the guiding member or arm into the first, extended position by means of a biasing force. After engaging, the guiding member will have been forced into the second, or retracted position. But with this embodiment, after disengaging, the guiding member will be biased back to the extended position, ready for maximum range in engaging the other guiding member.

Advantageously, the biasing means comprises biasing force reduction means arranged to exert a smaller biasing force when the guiding member is the second position than when in the first position. Without this measure, the biasing force might be strong enough to disengage the vehicle from the station, which is undesirable. By arranging for a reduced biasing force when the guiding member is in the second position, a more stable situation, during charging, is obtained.

Preferably, the biasing force reduction means comprises a non-linear force spring, in particular a leaf spring or a torsion leaf spring. Alternatively or additionally, the biasing force reduction means comprise a linkage system with a tension spring having a force moment arm and arranged to shorten the force moment arm as the guiding member moves from the first to the second position. The above are elegant solutions for providing a decreasing biasing force when the guiding member moves into the second position, during engaging of the vehicle and the station.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1A:
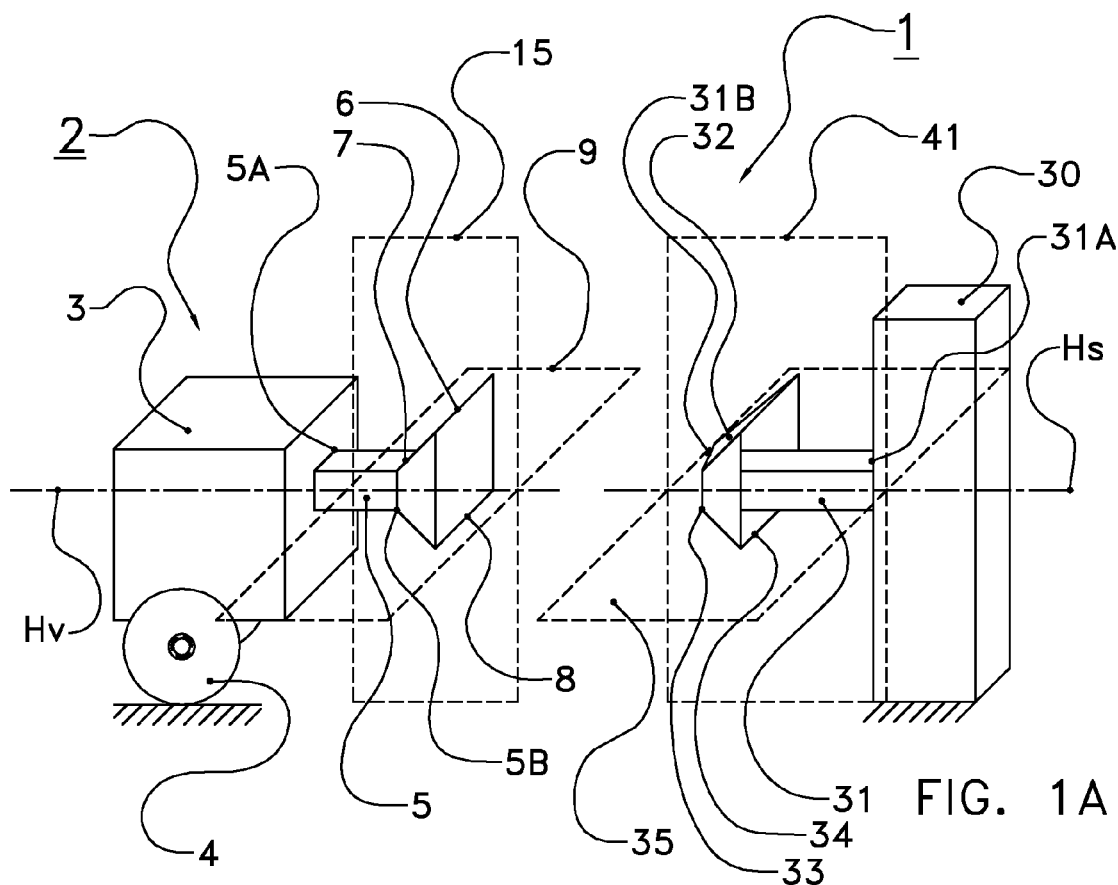
FIG. 1A is a schematic view of the vehicle system of the invention with the vehicle and the charging station in a non-charging position.
Figure 1B:
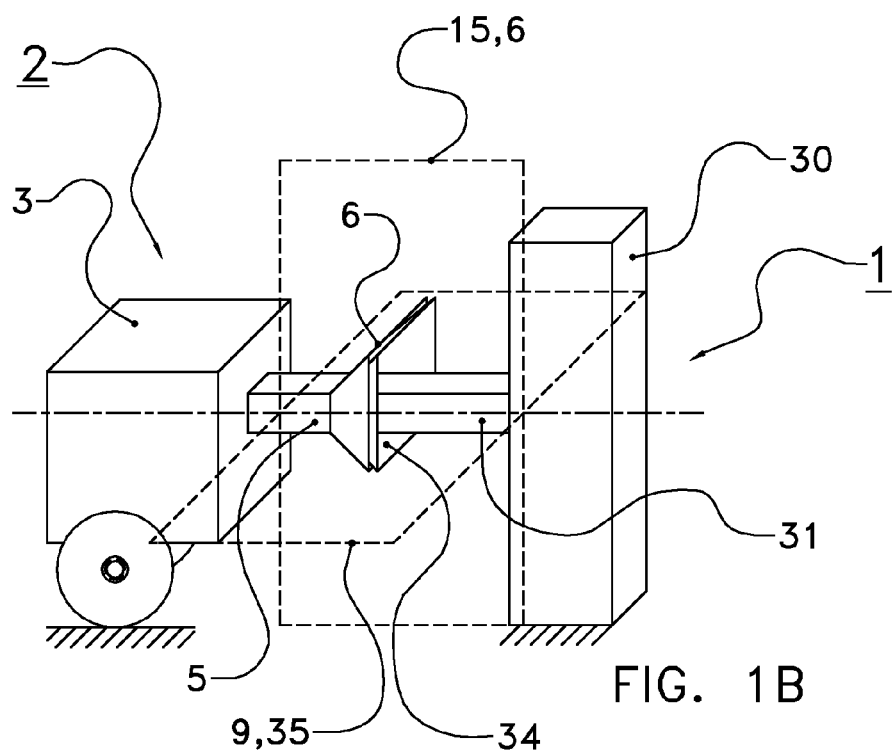
FIG. 1B is a schematic view of the vehicle system of the invention with the vehicle docked at the charging station in a charging position.

The following is a description of certain embodiments of the invention, given by way of example only and with reference to the drawings. FIG. 1A shows the vehicle system 1 of the invention with vehicle 2 and charging station 30. Vehicle 2 is an autonomously movable, electrically driven vehicle and is dockable with charging station 30. Vehicle 2 is shown in FIG. 1A as being at a distance from charging station 30. FIG. 1B shows vehicle 2 docked to the charging station 30.

Vehicle 2 is an autonomously movable electrically powered vehicle and can move around by wheels driven by an electrical motor. The power in the vehicle is stored in onboard rechargeable batteries. An inlet side coupling means 5, 6 (explained below) is provided on vehicle 2 to facilitate docking with an outlet-side coupling means 31,32 on the charging station, explained below. Both coupling means are, when mutually engaged, arranged to transport energy from the charging station to the batteries to charge them. When the batteries need to be recharged, the vehicle is programmed to navigate to charging station 30, dock with it such that the inlet side coupling means is connected to a power supply outlet of the charging station and energy can flow to the batteries for charging.

Vehicle 2 as depicted in FIGS. 1A and 1B, is shown only schematically and includes vehicle body 3, drivable wheels 4 and an arm 5 mounted to body 3 at a first arm end 5A and ending at its free end 5B in a truncated pyramid 6. Truncated pyramid 6 includes a pyramid top 7 at arm end 5B and a base 8 facing away from vehicle body 3 and forming an entrance to the pyramid.

Arm 5 and thus pyramid 6 are deflectingly movable relative to vehicle body 3, in at least a first, substantially horizontal plane 9. Arm 5 and thus pyramid 6 is, in this case, also deflectingly movable relative to vehicle 2 in a third, substantially vertical plane 15. A center line Hv through the center of arm 5 and guiding member pyramid 6 lies in both horizontal plane 9 and vertical plane 15 where these planes intersect.

The vehicle is shown to be positioned and drivable on a horizontal plane, like a floor and horizontal plane 9 is shown to be parallel to the floor. In most imaginable situations, plane 9 will be parallel to a floor plane. However, there are situations when this may not be the case, e.g. when the wheels include inflatable tires and the vehicle has a single flat tire. In such situations plane 9 is at an angle to the floor plane.

Charging station 30, as schematically represented in FIGS. 1A and 1B, is depicted as a vertical column on a floor in a fixed location.

Arm 31 is mounted at first arm end 31A deflectingly moveable to station 30. Truncated pyramid 32 is provided on arm 31 ends at free end 31B. Truncated pyramid 32 is shaped complementary to pyramid 6 of the vehicle. Its pyramid top 33 is at free arm end 31B and facing away from the station 30 while pyramid base 34 faces towards station 30. In this manner the two pyramids can mate, with truncated pyramid 6 of the vehicle being the female member and truncated pyramid 32 of the charging station being the male member.

Arm 31 and thus also truncated charging station pyramid 32 can deflectingly move relatively to the charging station in second, substantially horizontal plane and in this case also in a fourth, substantially vertical plane 41. A center line Hs through the center of arm 31 and guiding member pyramid 32 and lies in both horizontal plane 35 and vertical plane 41 where these planes intersect.

The respective vehicle and station pyramids 6, 15 are rigid members which by being at the end of the deflectingly mounted arms cause deflection in the required directions during mating of the pyramids and thus facilitating alignment thereof. Since the shape and size of the vehicle pyramid 6 and the charging station pyramid 32 are complementary, they can perfectly mate. Of course, any other couple of complementary forms is possible, such as irregular pyramids, three- to eight-sided pyramids, rimmed cones. The preferred shape does include a frustum. Note that shapes with faces provide much more reliable docking, as they limit directional uncertainty. These faces need not necessarily be, but preferably are, flat faces. What counts is that full rotational symmetry is broken.

Once the pyramids 6, 32 are mated, all the corresponding pyramid walls of each pyramid are in contact with each other, and relative movement of one pyramid to the other is no longer possible. In the movement of docking the mated pyramids will then move further towards the charging station, because the charging station pyramid 32 can telescopically move along charging station arm 31. This movement finally causes the charging position to be obtained. As is shown in FIG. 1B, when vehicle 2 is docked to station 3 in the charging position, vehicle pyramid 6 is mated to station pyramid 32, and the horizontal planes 9, 35 and the vertical planes 15, 41 coincide and the two center lines Hv and Hs coincide. Although not shown in FIG. 1B, vehicle arm 5 and/or station arm 31 may be at an angle relative to the respective vehicle 2 or charging station 30.

Figure 2:
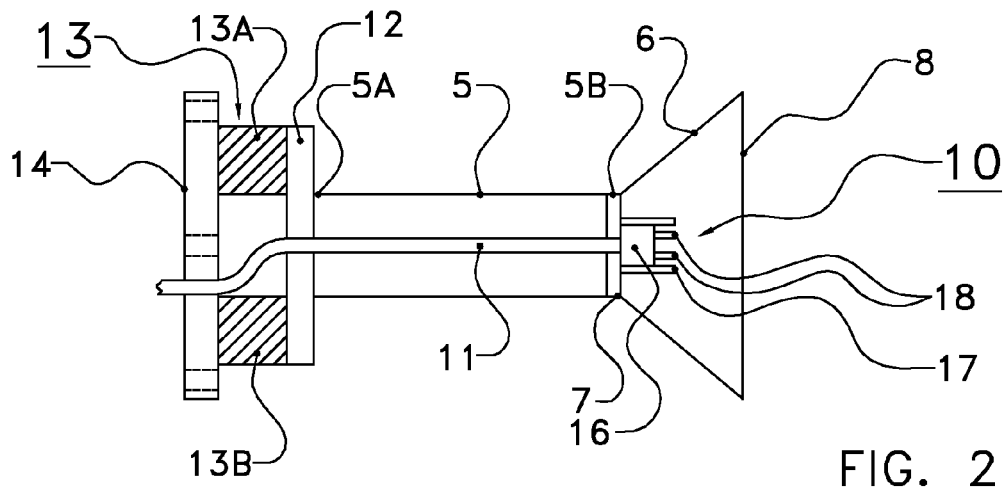
FIG. 2 is a schematic view of the inlet-side coupling means of the vehicle of the vehicle system of the invention.

FIG. 2 is a schematic view of inlet-side coupling means of vehicle 2, and shows an arm 5, truncated pyramid 6, electrical plug 10 and wire 11. Arm 5 is a hollow arm and is provided at first arm end 5A with a first end plate 12 to which a first deflecting member 13 is mounted. The deflecting member is in the form of a pair of resilient members 13A, 13B in the shape of solid, resilient plastic cylinders. The end plate 12 with the cylinders 13A, 13B and the arm is mounted to vehicle 2 (not shown) by means of a bracket 14. Cylinders 13A, 13B are fixed to both the end plate and the bracket by any suitable means, such as e.g. a bolt and nut connection through a cylinder and both end plate and bracket, or by adhesives. Thus arm 5 and the other parts of the inlet-side coupling means, such as pyramid 6, are deflectingly movable with respect to the vehicle in horizontal first plane 9 (shown in FIG. 1A, 1B).

The pair of resilient solid cylinders 13A, 13B are mounted, spaced apart one higher than the other, to the first end plate, and by way of the bracket 14 also to the vehicle 2. This orientation of cylinders 13A, 13B one above the other allows for relative more deflection of arm 5 and thus of pyramid guiding member 6, in horizontal plane 9 and then in vertical plane 15. This is acceptable because the height position of the inlet-side coupling means of the vehicle and thus of arm 5 on the vehicle is designed to match the height position of outlet-side coupling means and thus of arm 31 on charging station 30. These height positions are not expected to vary much in use and vertical misalignment of the coupling means is expected to be small. Some vertical deflection is still desirable and thus provided because some vertical misalignment may still occur: in use, the wheels having air tires may be at a lower pressure, thus lowering the vehicle relative to the station, or e.g. dirt may accumulate at the docking site, lifting the vehicle relative to the station. Thus the deflection member 13 is designed to allow arm 5 to deflectingly move relative to vehicle 2 in horizontal plane 9 and in vertical plane 15 (shown in FIGS. 1A, 1B).

Plug 10 is mounted in the arm at arm end 5B and projects into the truncated pyramid 6 facing towards base 8, and thus away from the vehicle.

Plug 10 is shown to include a plug body 16, a plug shell 17 and plug pins 18. As is shown in FIG. 2 the plug shell 17 surrounds the plug pins 18 which project from the plug body 16.

Figure 3A:
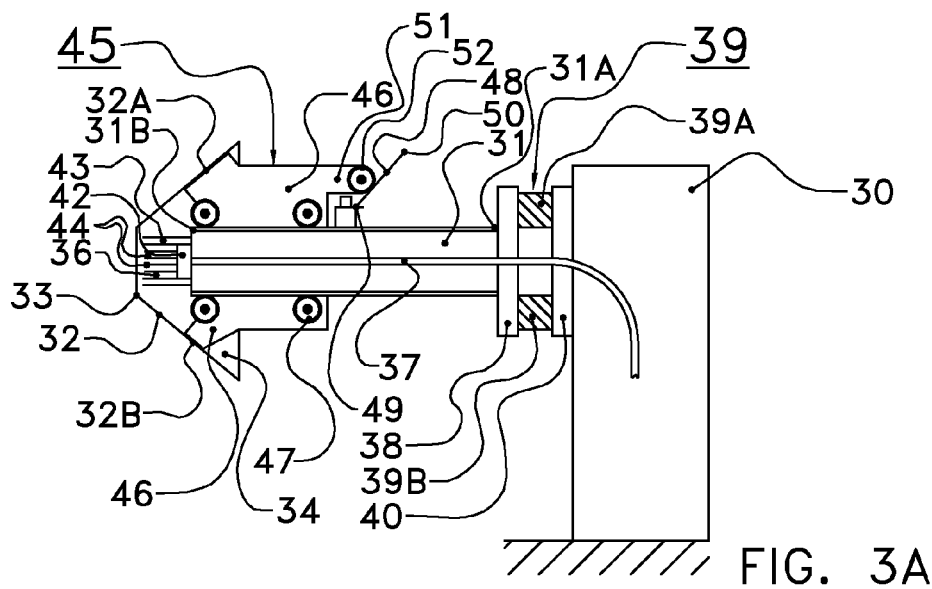
FIG. 3A is schematic view of the outlet-side coupling means of the charging station, according to the invention.

FIG. 3A is a schematic view of the outlet-side coupling means of charging station 30, and shows arm 31, truncated pyramid 32, electrical socket 36 and wire 37. Arm 31 is a hollow arm, first end 31A of arm 31 is provided with an end plate 38 to which a deflecting member 39 is mounted. The deflecting member 39 is similar to the deflecting member of vehicle 2 and is in the form of a pair of resilient members 39A, 39A in the shape of solid resilient cylinders 39A, 39B. The mounting of the deflecting member 39 to the station is also similar to the mounting of the deflecting member 13 to the vehicle. The end plate 38 with the deflecting member 39 is mounted to charging station 30 by means of a bracket 40. Cylinders 39A, 39B are fixed to both the end plate and the bracket by any suitable means, such as e.g. a bolt and nut connection or by adhesive. Thus arm 31 and the other parts of the inlet-side coupling means, such as pyramid 32, are deflectingly movable with respect to the vehicle in horizontal first plane 9 (shown in FIG. 1A, 1B).

The deflecting member 39 being similar to the one described relation of the vehicle, also has a pair cylinders 39A, 39B which are mounted, spaced apart one higher than the other, to the end plate 38, and by way of the bracket 40 also to the charging station 30 Like for the vehicle, the deflection member 39 allows arm 31 to deflectingly move relative to charging station in a horizontal, third plane 35 and but less so in a vertical, fourth plane 41. This is done for the same reasons as recited above in the description of inlet-side coupling means 5 of FIG. 2.

As shown in FIG. 3A socket 36 includes a socket body 42, a socket shell 43 surrounding the socket body and a least one socket contact channel 44 in the socket body 42.

Socket 36 is mounted to free arm end 31B with socket contact channels 44 facing away from the charging station. Truncated pyramid outlet-guiding member 32 is also mounted to arm 31, its open pyramid top 33 also facing away from the charging station 30. Both socket 36 and pyramid 32 are mounted to the arm 31 such that when the charging station 30 is not occupied by vehicle 2, socket 36 is adjacent the opening of pyramid top 42 without projecting beyond it.

The truncated pyramid 32 as outlet-guiding member on the charging station is mounted telescopically movably to arm 31. A mounting member 45 includes mounting plates 46 that are connected to the pyramid 32 on the inside of pyramid sides 32A, 32B. The mounting plates 46 carries freely rotatable rollers 47 positioned such that the rollers 47 rest on an outer surface of the arm 31. Ideally there is at least one pair of rollers that rest on opposite outer surfaces of the arm. Preferably, as shown in FIG. 3A, for stability of the telescopically movable pyramid 32 relative to the arm, two pairs of rollers are used that are spaced apart along a length of the arm.

FIG. 3A also shows a first embodiment of a biasing means 48 positioned between the telescopically movable outlet-side guiding member or pyramid 32 and the charging station 30. The biasing means 48 forces the pyramid 32 to a position at a maximum distance from the charging station 30, the position it is in when no vehicle is occupying the station. In such a free or rest position, the pyramid surrounds socket 36. This is shown in FIG. 3A.

The biasing means 48 as shown in FIG. 3A is a leaf spring 48 that is fixed at one end 49 to the arm 31 and free at another end 50.

The pyramid mounting plate 46 is provided with a leg 51 to which a roller 52 is mounted, and the roller is in contact with the leaf spring 48. As the charging station pyramid 32 is pushed by the vehicle pyramid 6 towards the charging station 30, roller 52 rides along the length of the leaf spring 48, forcing it towards the arm 31 against its spring force. After charging, as the vehicle backs away from the charging station, charging station pyramid 32 is also pushed backwards towards the end of the arm 31 by the biasing force of leaf spring 48. The force of the spring is chosen such that it is strong enough to push the charging station guiding member or pyramid 32 to its position at maximum distance from the charging station. The force of the leaf spring 48 is also chosen such that it will be too weak to push a docked vehicle away and out of charging contact with the charging station.

Figure 3B:
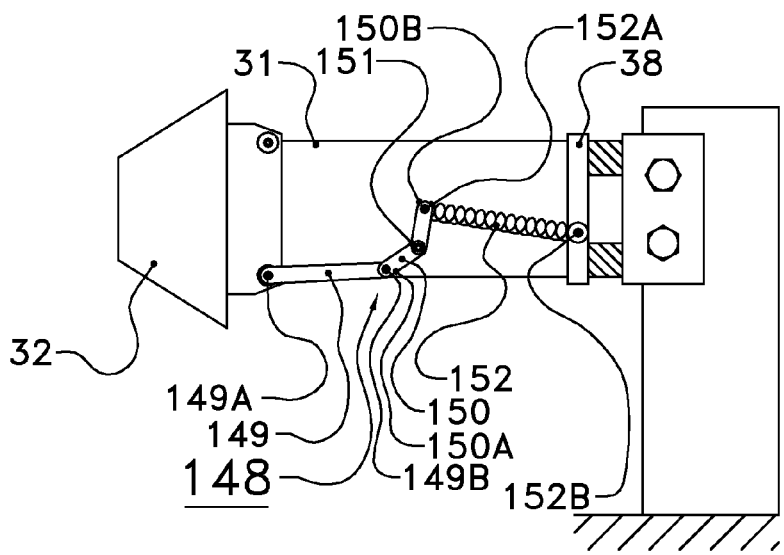
FIG. 3B is a schematic view of another outlet-side coupling means.

FIG. 3B is a schematic view of a further embodiment of the biasing means positioned between the telescopically outlet-side guiding member or pyramid 32 and the charging station 30. In the description of this embodiment of the biasing means, like reference numerals are used as in FIG. 3A, increased by 100 for the biasing means.

The biasing means 148 includes a pair of spring biased linkages at opposite sides of arm 31, only one of which is shown in FIG. 3B and is described here. The spring biased linkage includes a first straight bar 149 pivotably mounted at one end 149A to the telescopically movable pyramid 32 and at the other end 149B to a first end 150A of a second curved bar 150. The curved bar 150 is pivotably mounted to arm 31 on a central pivot 151. The second end 150B of curved bar 150 is connected to a first end 152A of a helical tension spring 152. The other end 152B of the helical tension spring is mounted to end plate 38 of arm 31. When no vehicle is occupying charging station 30, tension spring 152 pulls at curved bar 150 and forces the linkage to straighten out to its maximum length. In this position pyramid 32 is at a maximum distance from the charging station 30. The angle between straight bar 149 and curved bar 150 is at a maximum. When a vehicle docks, it drives up to the charging station 30 and following the mating of the vehicle pyramid 6 to the station pyramid 32, pushes station pyramid 32 telescopically inward towards the end plate 38 of arm 31. By this action the straight bar 149 pushes curved bar 150 to rotate about central pivot 151. The distance between central pivot 151 and helical spring 152 is now reduced, and the biasing force on the outlet-side guiding member or charging station pyramid 32 is now reduced to such a level that the vehicle once in docked and when it stops pushing will not be pushed away by the biasing means.

In the charging position as shown in FIG. 1B plug 10 of vehicle 2 and socket 36 of charging station are duly plugged-in and an electrical conductive contact of the plug is in contact with a charging contact of the socket.

In use, when vehicle 2 needs to be charged, it will approach the charging station. The vehicle 2 is programmed to drive up to the charging station until it is docked. When the charging position is reached, i.e. when voltage is detected, the vehicle will stop driving. Until that point the vehicle continues to push forward. While approaching the station for charging, first the vehicle will align itself such as programmed with the station. Further forward movement of the vehicle to the station will bring the vehicle pyramid into contact with the station pyramid and allow the pyramids to mate. Since the pyramids can deflectingly move relative to vehicle and station respectively, deflection in the required direction allows for perfect alignment of the pyramids and thus for mating engagement of one another. The mated surfaces of the vehicle pyramid and station pyramid prevent relative (rotational, shifting etc) movement and ensure perfect alignment of plug 7 with socket 34 and in particular of the electrical contacts and its narrow electrical pins 18 are aligned with electrical socket channels 44 that need to contact each other to allow charging. From the mated position, upon further forward movement of the vehicle station, pyramid 32 is pushed towards the charging station 30 along arm 31. Pyramid 32 slides away and exposes socket 34 and channels 44 and plug 7 with pins 18 is plugged in. The charging position is thus obtained easily and reliably. After the batteries of the vehicle are sufficiently charged, or after a certain time period, the vehicle is programmed to move away from the charging station. Upon backing away from the charging station, the plug is pulled from the socket. As the vehicle moves further away, the vehicle pyramid will move away and out of contact with the station pyramid. The station pyramid, being biased by the biasing member, will resume its position at the end of the arm.

Instead of using a plug on the vehicle and a socket on the charging station, interchanging of plug and socket is of course possible, resulting in a plug on the charging station and a socket on the vehicle.

Also inductive plug and socket arrangements are feasible, similar to e.g. a typical electrical toothbrush charging arrangement, where the charger has a first coil and a pin and the toothbrush includes a secondary coil surrounding an opening which can be mated with the pin of the charger. The electromagnetic field of the coils is used to transfer energy.

The arms 5, 31 between vehicle body 3 and vehicle pyramid 6 and charging station 30 and station pyramid 32 respectively, and in particular the length thereof, influence the range of the deflective movability of the pyramids. If reduction of the range is acceptable, one or both arms may be shortened or omitted. If an arm is omitted, the corresponding pyramid needs to be mounted deflectingly moveable directly to the vehicle.

Charging station 30 need not be a column on a floor as shown in FIGS. 1A and 1B, but may as well be a power source integrated in a wall, with arm 31 projecting from the wall. Also in the feasible situation where vehicle pyramid 6 is telescopically movable with respect to vehicle arm 5 and charging station pyramid 34 is not telescopically movable, the charging station arm may be shortened or omitted. If the arm 31 is omitted the charging station pyramid must be mounted deflectingly moveable directly to the charging station or wall in which the charging station is integrated.

The deflecting members 13, 39 are shown as pairs of solid resilient cylinders 13A, 13B, 39A, 39B but can be in any other shape allowing the deflective movement of the pyramids relative to the vehicle, respective charging station. Thus hinges may be provided with at least a first hinge axis perpendicular to horizontal planes 9, 35, allowing movement in these horizontal planes of the respective pyramids. Double hinges with additional hinge axes to allow deflecting movement in both horizontal and vertical plane may be used. Alternatively a ball joint may be used.

The term comprising when used in this description or the appended claims should not be construed in an exclusive or exhaustive sense but rather in an inclusive sense.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A vehicle system comprising:
   at least one charging station and at least one autonomously movable, electrically powered vehicle dockable therewith,
   the vehicle including an inlet-side coupling device and the charging station including an outlet-side coupling device,
   said inlet-side coupling device and said outlet-side coupling device being mutually engageable and arranged to transport energy between the charging station and vehicle when engaged,
   said inlet-side coupling device and said outlet-side coupling device further being provided with an inlet-side guiding member, an outlet-side guiding member, respectively, arranged to guide the inlet-side and outlet-side coupling device from a non-charging position into a charging position upon engaging of said inlet-side and outlet-side coupling device when docking the vehicle to the charging station,
   wherein said inlet-side coupling device is arranged to be deflectingly movable relative to the vehicle in a first plane, and said outlet-side coupling device is arranged to be deflectingly movable relative to the charging station in a second plane,
   wherein said first plane and said second plane are arranged substantially horizontally, to enable alignment of the inlet-side and outlet-side coupling device upon their engaging.

2. The system according to claim 1, wherein said inlet-side coupling device comprises one of an electric socket or a complementary plug, and said outlet-side coupling device comprises an other of said electric socket and said complementary plug.

3. The system according to claim 1, wherein said inlet-side coupling device and said outlet-side coupling device are arranged to be deflectingly movable in a third plane relative to the vehicle, and a fourth plane relative to the charging station, respectively, wherein said third plane and said fourth plane are arranged substantially parallel, to enable alignment of the inlet-side and outlet-side coupling device upon their engaging, and wherein the third plane makes a non-zero angle with the first plane.

4. The system according to claim 1, wherein at least one of the coupling device or the guiding members is arranged to be linearly telescopically movable in a direction within the first plane and relative to one of the vehicle and the charging station, to which it is provided.

5. The system according to claim 1, wherein both the coupling device and the guiding members are arranged to be linearly telescopically movable in a direction within the first plane and relative to one of the vehicle and the charging station, to which it is provided.

6. The system according to claim 4, wherein the direction of linear telescopic movement substantially coincides with the direction of travel of the vehicle when docking to the charging station.

7. The system according to claim 1, wherein a deflecting member is provided between said vehicle and said inlet-side coupling device, and between said charging station and said outlet-side coupling device.

8. The system according to claim 7, wherein the deflecting member comprises a hinge with at least a first hinge axis perpendicular to the first plane.

9. The system according to claim 8, wherein the deflecting member further comprises a second hinge with a second axis perpendicular to the second plane.

10. The system according to claim 7, wherein the deflecting member comprises a ball joint.

11. The system according to claim 7, wherein the deflecting member comprises at least one resilient member.

12. The system according to claim 11, wherein the deflecting member comprises at least two resilient members positioned one behind the other in a plane perpendicular to the first plane.

13. The system according to claim 4, wherein the linearly movable guiding member is provided with a biasing device between the guiding member and the vehicle or charging station to which it is provided, the biasing device being arranged to force the guiding member or arm into a first, extended position via a biasing force, and in which first position the guiding member is at a maximum distance from the vehicle or charging station on which it is provided.

14. The system according to claim 13, wherein the biasing device comprises a biasing force reduction device arranged to exert a smaller biasing force when the guiding member is in the second position than when in the first position.

15. The system of claim 14, wherein the biasing force reduction device comprises a non-linear force spring.

16. The system of claim 15, wherein the biasing force reduction device comprises a leaf spring or a torsion leaf spring.

17. The system of claim 14, wherein the biasing force reduction device comprise a linkage system with a tension spring having a force moment arm and arranged to shorten the force moment arm as the guiding member moves from the first to the second position.

* * * * *